S. PLUMLEY.
UNIVERSAL METAL CUTTING APPARATUS.
APPLICATION FILED JAN. 13, 1919.

1,352,760.

Patented Sept. 14, 1920.
2 SHEETS—SHEET 1.

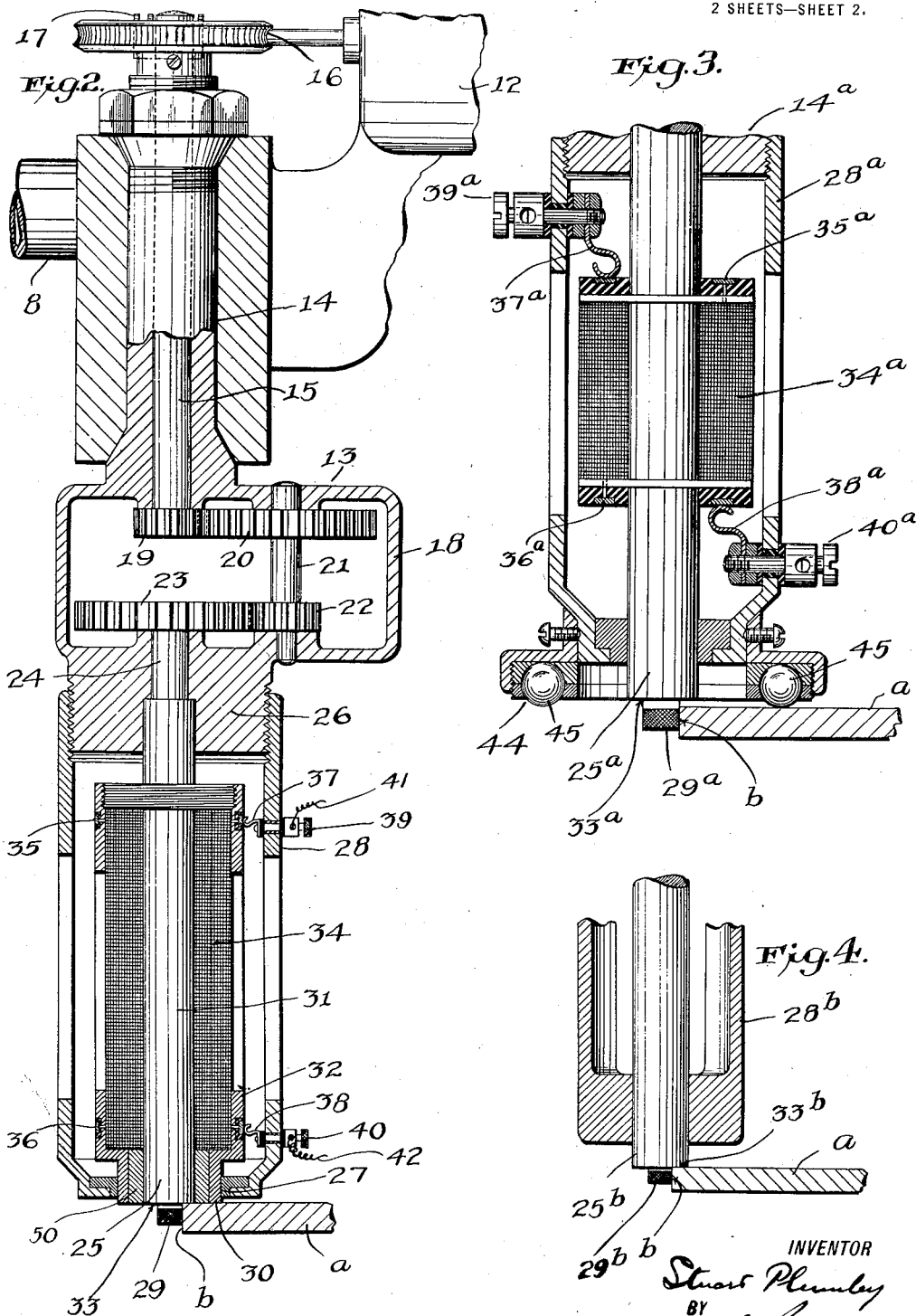

UNITED STATES PATENT OFFICE.

STUART PLUMLEY, OF WESTFIELD, NEW JERSEY, ASSIGNOR TO DAVIS-BOURNONVILLE COMPANY, OF NEW YORK, N. Y., A CORPORATION OF NEW YORK.

UNIVERSAL METAL-CUTTING APPARATUS.

1,352,760.  Specification of Letters Patent.  Patented Sept. 14, 1920.

Application filed January 13, 1919. Serial No. 270,835.

*To all whom it may concern:*

Be it known that I, STUART PLUMLEY, a citizen of the United States, and resident of Westfield, in the county of Union and State of New Jersey, have invented a new and useful Universal Metal-Cutting Apparatus, of which the following is a specification.

The invention relates to automatic apparatus for effecting cutting of metals by means of gases along irregular lines or in accordance with any desired design or guide. The improvements are applicable, for example, to apparatus of the type disclosed in the Bucknam Patents, No. 1,059,271, dated April 15, 1913, and No. 1,104,289, dated July 21, 1914, wherein the cutting torch is carried by a pantographic or universally movable frame, which is operated by a motor-driven tracer so as to cause the torch while cutting to reproduce any given pattern. The particular form of driven tracer disclosed in those patents is a swiveled wheel, which is steered by hand over a plane design. The present invention makes the operation entirely automatic and insures accuracy, by employing a tracer or feed member capable of adhering to the boundary of a guide or templet, so that upon starting the motor the torch executes the desired cut without further attention. In one form the tracer is magnetic, in another it is frictional, and in still another it utilizes both magnetism and friction to hold it to its course. The magnetic feed roller operative along a vertical face or edge may also be embodied in conjunction with a universally movable support and a cutting torch in other specific forms of cutting apparatus.

In the drawings forming a part hereof:

Fig. 2 is an enlarged sectional elevation of the tracer and its driving means;

Fig. 3 is a fragmentary vertical section through the lower part of an alternative form of tracer;

Fig. 4 is a similar view showing still another form; and

Figure 1:
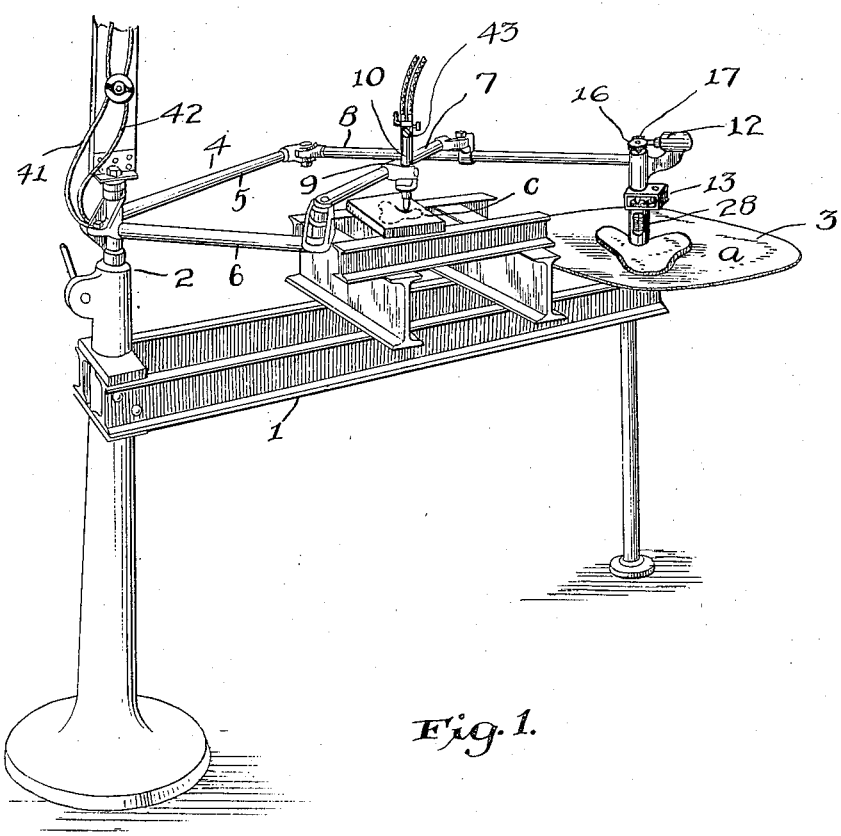
Figure 1 is a perspective view of an apparatus embodying the invention.
Figure 5:
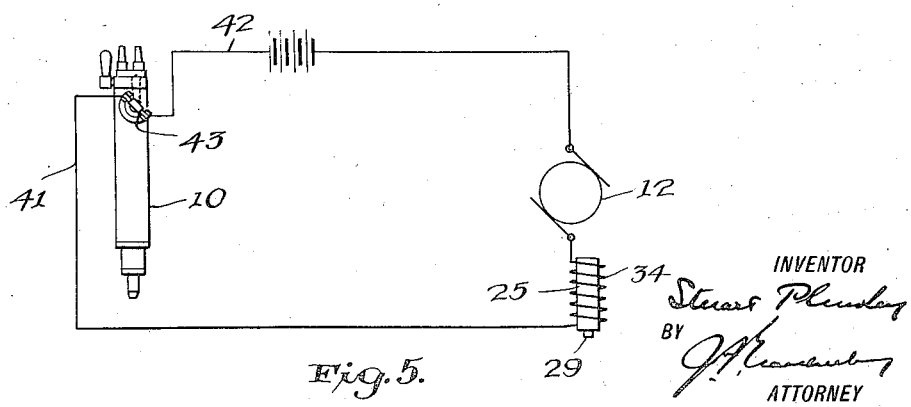
Fig. 5 is a wiring diagram.

1 is a suitable frame, having a bearing post 2 at one end and a pattern table 3 at the other end. A horizontal pantographic arm 4, comprising pivotally jointed parallelogram members 5, 6, 7 and 8, is pivoted at the joint between members 5 and 6 upon the bearing post. The member 7 has a holder 9 for a downwardly directed, oxyacetylene or other cutting torch 10, and the member 8 is extended to carry a tracer 11 and an electric motor 12 for driving it. With such a construction the movements of the tracer are reproduced on a smaller scale by the cutting flame, but the invention is not necessarily limited to this particular form, as other kinds of universally-movable or motion-reproducing frames may be employed.

As shown more particularly in Figs. 2 and 3, the tracer is mounted in a downwardly projecting hollow bracket 13, which is fixed to the member 8. In the upper or neck portion 14 of the bracket is journaled a shaft 15, bearing on its upper end a worm-wheel 16, which meshes with a worm 17 on the shaft of the motor. On the lower end of said shaft, within a frame portion 18 of the bracket, is a small spur gear 19, which meshes with a large gear 20 on a vertical countershaft 21, the lower end of which carries a small gear 22, meshing with a large gear 23 on the upper, journal extremity 24 of a rotary tracer member 25. By means of these gears the speed of the motor is appropriately reduced at the tracer, and the speed may be varied in the ordinary manner by a rheostat or motor-controller, not shown.

The tracer member is journaled in bearings 26, 27 at top and bottom of a lower frame portion 28 of the bracket, and in this form comprises an electro-magnet having concentric poles 29, 30, the said poles being at the lower ends of a central core 31 and an encircling shell 32, the latter of which turns in the bearing 27.

The polar end 29 of the core 31 projects below the annular pole face of the shell 32, and is reduced to form a small-diameter roller suitable to travel upon the edge of a templet *a*, the vertical or side face *b* of which determines the contour of the cut to be made by the torch. This portion is also preferably milled or roughened, as indicated, to enable it to act effectively as a feed roller. The bottom of the pole 30, together with the shoulder 33 upon the central pole piece and the bottom of a non-magnetic spacer 50, or any of these, form a friction face to bear upon the top of the templet.

By utilizing both poles, the magnet is made very effective to hold the feed and guide roller against the boundary of the templet, and the action of the coaxial rotating friction surface is such as to contribute to the same result. If desired, however, a roller-bearing foot 44, such as shown in Fig. 3, may be placed upon the bottom of the tracer bracket, to hold the pole 30 and shoulder 33 slightly above the top of the templet, in order to relieve the motor of the frictional drag.

The energizing coil 34, which is disposed about the core 31 and within the shell 32 has its terminals connected with insulated conductor rings 35, 36 on the outside of the shell, where they are in contact with brush terminals 37, 38 connected with binding-posts 39, 40 on the frame portion 28 of the tracer bracket. These binding-posts are connected by suitable wiring 41, 42 in circuit with the motor 12 and a suitable source, such as a battery, so that the same switch 43 which starts and stops the motor also energizes and deënergizes the magnetic tracer which is driven by it. As in the Bucknam Patent 1,118,183 of November 24, 1914, the switch is desirably connected mechanically with the cutting oxygen valve of the torch.

Fig. 3 shows a form of the tracer in which a bar magnet tracer member 25ª is employed. In this case only the one pole 29ª coöperates with the templet. An annular foot 44, carrying a series of anti-friction balls 45 is shown attached to the lower end of the tracer bracket, to bear upon the top of the templet and to hold the annular shoulder 33ª of the magnetic tracer member clear of it; but this foot may be removed, and in that event said shoulder will act as a friction top-bearing surface in the manner described in connection with the bottom face of the pole 30 of the other form. The conductor rings 35ª, 36ª in this instance are placed upon the top and bottom disks of the spool. Other parts similar in function to those illustrated in Fig. 2 are designated with the same numerals with supernumerals.

Fig. 4 illustrates the fact that the tracer may be caused to hug the guide by reason of friction alone. In this case there is no magnet, the tracer member 25ᵇ being a simple shaft or spindle, the lower end of which is reduced to form a side-bearing roller 29ᵇ and a top-bearing annular friction surface 33ᵇ. It is found that this surface, surrounding the side-bearing roller 29ᵇ, constantly presses the latter against the side of the templet while the tracer revolves, thus causing the tracer to follow the contour of the templet whatever its form. Other parts corresponding generally to parts in the other views bear the same reference numerals distinguished by super-character $b$.

From the foregoing, it will be understood that in order to make a cut of some irregular character, or to cut out a piece of predetermined shape from a block $c$, all that is necessary is to provide a suitable templet $a$, of magnetic material, if the tracer is provided with means for magnetizing it, and to position properly the torch, tracer, work and templet, whereupon, on lighting the torch and starting the motor, the tracer will follow along or around the boundary of the templet, causing the torch to execute the desired cut without the necessity for manual control.

What I claim as new is:

1. The combination of a torch-bearing motion-reproducing frame, a rotary tracer device mounted on the frame with its axis of driven rotation perpendicular to the plane of movement and adapted to adhere to the boundary of a guide or templet, and driving means for rotating the tracer device about said axis.

2. The combination with a cutting torch and a frame movable universally in horizontal directions whereon the torch is mounted, of a tracer device on the frame rotatable about a vertical axis and adapted to adhere to the boundary of a guide or templet, and driving means for rotating the tracer device about said vertical axis to cause it to roll along the templet.

3. The combination with a cutting torch and a frame whereby the torch can be moved universally in a plane, of means for controlling the torch movement comprising a rotary driven magnetic tracer device adapted to follow the boundary of a guide or templet.

4. The combination with a cutting torch and a frame whereby the torch can be moved universally in a plane, of a rotary driven tracer device mounted on the frame with its axis of driven rotation perpendicular to the plane of movement, and means for magnetizing the tracer device.

5. In an apparatus of the kind described, having a frame movable in universal horizontal directions, a tracer roller provided with mechanical driving means and mounted on the frame with its axis vertical, and electro-magnetic means for enabling said roller to follow the boundary of a guide or templet.

6. In an apparatus of the kind described, the combination with a frame capable of universal movement in a plane, of a tracer device for controlling the movements of the frame comprising a magnetic roller having its axis perpendicular to the plane of movement, and means for driving said magnetic roller so as to travel upon the boundary of a guide or templet.

7. In an apparatus of the kind described, having a frame movable in universal horizontal directions, a rotary driven magnetic tracer device mounted upon the frame to turn about a vertical axis of revolution and having a friction shoulder to rest upon a guide or templet and a roller portion to travel in contact with its side.

8. In an apparatus of the kind described, having a frame movable in universal horizontal directions, a tracer bracket projecting downward from the frame, an electromagnetic tracer device mounted therein to turn about a vertical axis, and mechanical means for driving said tracer device.

9. In an apparatus of the kind described, having a frame movable in universal horizontal directions, an electro-magnet mounted on the frame to rotate about a vertical axis and having a polar portion adapted to roll upon the boundary of a guide or templet, means for driving the magnet, and means for supplying the coil of the rotating magnet with energizing current.

10. In an apparatus of the kind described, having a frame movable in universal horizontal directions, a rotary driven electro-magnet mounted on the frame to turn about a vertical axis and having concentric poles, of which the outer is adapted to extend over the top of a guide or templet while the inner projects below to contact with the side thereof.

11. In an apparatus of the kind described, having a frame movable in universal horizontal directions, a rotary driven electro-magnet mounted on the frame to turn about a vertical axis and having concentric poles, of which the outer constitutes a friction shoulder to rest upon the top of a guide or templet, while the inner forms a downwardly projecting roller adapted to act upon the side of the templet.

12. In an apparatus of the kind described, a rotary driven magnetic tracer device adapted to follow the boundary of a guide or templet.

13. In an apparatus of the kind described, a rotary driven combined magnetic and friction tracer device mounted to turn about a vertical axis and adapted to rest upon and to follow the boundary of a guide or templet.

14. In an apparatus of the kind described, a rotary driven tracer device mounted to turn about a vertical axis and having coaxial rotary top- and side-bearing portions to coöperate with a guide or templet.

15. The combination with a cutting torch and a frame whereby the torch can be moved in universal horizontal directions, of means for controlling the torch movement comprising a rotary driven tracer device mounted to turn about a vertical axis and having a friction shoulder to rest upon the top of a guide or templet and a coaxial downward projection to coöperate with the side thereof.

16. In an apparatus of the kind described, having a frame universally movable in horizontal directions, a mechanically-driven tracer device comprising a member rotatable about a vertical axis and having coaxial friction-top-bearing and roller-side-bearing portions to coöperate with a guide or templet.

17. In an apparatus of the kind described, the combination with a frame movable in universal horizontal directions, of mechanical driving means thereon, and a tracer device driven by said means and comprising a member rotatable about a vertical axis and having an annular friction surface to bear upon the top of a guide or templet and a portion to bear against the side thereof.

18. In apparatus of the kind described, the combination of a rotary tracer device and feed member, electro-magnetic means for causing said member to adhere to the boundary of a guide or templet, means including an electric motor for driving the member, and means for energizing and de-energizing the electro-magnetic means simultaneously with the starting and stopping of the motor.

STUART PLUMLEY.